United States Patent
Carter

(10) Patent No.: US 8,221,847 B2
(45) Date of Patent: Jul. 17, 2012

(54) ACTIVE ICE-PHOBIC FREEZE-POINT REDUCING ANTI-ICE COATING AND METHOD FOR PROVIDING ANTI-ICE PROTECTION TO SURFACES

(76) Inventor: James Thomas Carter, San Francisco, CA (US)

(*) Notice: Subject to any disclaimer, the term of this patent is extended or adjusted under 35 U.S.C. 154(b) by 1008 days.

(21) Appl. No.: 12/010,122

(22) Filed: Jan. 22, 2008

(65) Prior Publication Data

US 2008/0175987 A1    Jul. 24, 2008

Related U.S. Application Data

(60) Provisional application No. 60/881,968, filed on Jan. 23, 2007.

(51) Int. Cl.
 *B05D 1/36* (2006.01)
(52) U.S. Cl. ............ 427/407.1; 427/155; 427/202; 427/203; 427/214; 252/70
(58) Field of Classification Search .......... 427/155, 427/202, 203, 214, 407.1; 252/70
See application file for complete search history.

(56) References Cited

U.S. PATENT DOCUMENTS

| | | | |
|---|---|---|---|
| 4,744,913 A | 5/1988 | Salvador | |
| 5,118,435 A | 6/1992 | Nieh | |
| 5,385,688 A * | 1/1995 | Miller et al. | 252/73 |
| 5,461,100 A | 10/1995 | Jenkins | |
| 5,653,054 A | 8/1997 | Savignano | |
| 5,708,068 A | 1/1998 | Carder | |
| 5,813,631 A | 9/1998 | Butler | |
| 6,194,685 B1 | 2/2001 | Rutherford | |
| 6,201,089 B1 | 3/2001 | Carter | |
| 6,326,446 B2 | 12/2001 | Carter | |
| 6,352,601 B1 * | 3/2002 | Ray | 156/71 |
| 6,458,877 B1 * | 10/2002 | Ahmed et al. | 524/275 |
| 2004/0236294 A1 * | 11/2004 | Drzewiecki et al. | 604/366 |

* cited by examiner

*Primary Examiner* — Robert S Walters, Jr.
(74) *Attorney, Agent, or Firm* — Robert Haines

(57) ABSTRACT

The present invention provides a method for providing anti-ice protection to surfaces, particularly aerodynamic surfaces, to prevent foul weather icing for extended periods of time and over repeated icing situations, comprising applying an organic polymer matrix layer to the surface where the organic polymer matrix layer comprises a homopolymer comprising up to 50% porous polymer solids having a pore size of up to 100 Angstroms and being capable of absorbing and chemically bonding an aqueous freeze-point depressant solution in amounts of up to 99.75% by weight.

13 Claims, 5 Drawing Sheets

ACTIVE ICE-PHOBIC FREEZE-POINT REDUCING ANTI-ICE COATING AND METHOD FOR PROVIDING ANTI-ICE PROTECTION TO SURFACES

FIELD OF INVENTION

The present invention is directed towards a surface preparation in the form of a coating, an adhesive backed film, a vacuum deposited, sprayed or painted aggregate or otherwise applied anterior polymer component layer containing an antifreeze fraction formulated, compounded, constructed and applied so as to lower the freezing point of critical ice-borne surfaces and a method for providing anti-ice protection to such surfaces. The deposited and renewable surface treatment will provide a useful benefit to eliminate, reduce or retard ice formation for single and repeated icing events on affected surfaces found on materials as diverse as airfoils, wind turbines, electrical transmission towers, rocket boosters, engine casings, wind screens, ground stations, building materials, freeze-protection blankets, and other foul weather use areas for extended periods of time without reapplication.

BACKGROUND OF INVENTION

Ice accumulation on surfaces consists of two treatable areas. The first is ice removal (deicing) which occurs by application of various deicing fluids or thermal or mechanical methods. The present invention accomplishes a second different function of ice prevention (anti-icing) the merits of which can be found on the ground as well as with in-flight aerospace use as well as with other surfaces of structures able to benefit by protection from freezing precipitation and other foul weather icing events. The purpose of this invention is to lower the freezing point of the metal surfaces on aircraft, rocket boosters and engine casings, as well as ground structures susceptible to ice accumulation from single and repeated icing events, such as power transmission towers, satellite tracking stations, metal equipment framework, cables, etc. The anti-icing function is accomplished by placing an aqueous freeze-point depressant solution in the absorbent fraction of a film suitably bonded to the surface of a structure so as to allow it to be maintained under adverse conditions of freezing rain, ice, snow, wind, air speed, temperature and time.

Fluids used for deicing and anti-icing typically are comprised of a blend of water and ethylene glycol or propylene glycol, in a ratio that ranges from 50:50, water to glycol, to about 20:80. They serve to lower the freezing point of water in the same manner that similar solutions provide anti-freeze protection in automobiles. For the purpose of this application the terms deicing fluid, anti-icing fluid and freeze-point reduction or depressant fluid will be used interchangeably. These fluids are sometimes diluted with water in the end use to match the weather conditions. Deicing fluids melt the frost, snow, or ice which has accumulated on, for example, aircraft surfaces, while the aircraft is on the ground, as well as provide protection against further accumulation and/or refreezing when no further precipitation occurs. Commonly sprayed on under pressure, the fluid melts the ice and snow while the force of the spray clears the surfaces. In the case of an aircraft, the formation of ice would change the aerodynamic flow characteristics of, for example, the wing of the aircraft and prevent its normal functioning. When these fluids are thickened, they provide an extended period of protection against frost, snow, and ice, i.e., an extended holdover time while the aircraft is on the ground, by remaining on the aircraft until take-off, and come off the surfaces when the aircraft becomes airborne. Such fluids are represented by U.S. Pat. No. 4,744,913, Salvador, et al., U.S. Pat. No. 5,118,435, Nieh, U.S. Pat. No. 5,461,100. Jenkins, U.S. Pat. No. 5,653,054, Savignano, et al. and U.S. Pat. No. 5,708,068, Carder, et al.

Deicing or anti-icing fluids have been classified as two types: unthickened and thickened. Unthickened deicing fluids are generally classified as Type I fluids, and are comprised of a blend of water and ethylene glycol or propylene glycol, in a ratio of about 20:80, water to glycol. They melt the frost, snow, or ice which has accumulated on the aircraft surfaces while the aircraft is on the ground. However, they do not provide adequate protection from further ice and snow formation. They mainly provide protection against refreezing when no further precipitation conditions occur.

Thickened deicing or anti-icing fluids, which have a ratio of about 50:50, water to glycol, are classified as either Type II or Type IV deicing fluids. They prevent ice and snow from forming on aircraft surfaces that remain on the ground for longer periods of time before take-off. Because they are thicker and more viscous, they remain on the aircraft until take-off rather than tending to flow off relatively soon after application as with Type I fluids. The thickened fluid is applied on to the aircraft surfaces after snow and ice have been removed, and snow and ice will then form on the coating, not on the aircraft surfaces. The thickened deicing coating is then removed from the aircraft by the shearing action during take-off when the aircraft reaches about 70 m/sec or 157 miles per hour. In neither case is long term protection against ice formation provided, even during flight, because the Type I through Type IV fluids eventually flow off of or are removed from the aircraft surfaces during take-off by airflow over the surfaces.

Deicing and anti-icing protection during flight have typically been provided by various means such as directed flow of engine exhaust or heat, electrical heaters built into or bonded to aircraft surfaces, or by providing a surface on an aircraft wing which can be selectively inflated and deflated to break up any ice formation. All of these add weight and complexity to aircraft systems and, in some cases, require that aerodynamic surfaces be reengineered to accommodate changes in airflow which cause changes in lift characteristics. Such mechanical, electrical and pneumatic ice removal systems are represented by U.S. Pat. No. 5,813,631, Butler, et al., U.S. Pat. No. 6,194,685, Rutherford and U.S. Pat. No. 6,352,601, Ray.

What is needed is a means to provide anti-icing protection to surfaces, particularly aircraft surfaces, which is lightweight and simple to apply and does not require additional complex mechanical and electrical means. A preferred form would be a coating which can be applied to surfaces as needed and which is highly absorbent of standard deicing and anti-icing solutions and has the ability to retain such fluids within the absorbent material under high load or wind conditions, i.e., while in flight, to provide extended time anti-icing for such surfaces.

SUMMARY OF THE INVENTION

A principal object of the present invention is to provide a freeze-point reducing method for single or repeated icing events comprising providing a freeze protection composite on a surface to be protected where the composite comprises a super absorbent polymer applied to the surface providing a continuous absorbent coating on the surface, and an aqueous freeze-point depressant solution applied to the super absorbent polymer coating whereby a content of at least 50% of the freeze-point depressant solution is absorbed and held by the super absorbent polymer providing freeze-point reduction throughout single or repeated icing events.

Another object of the present invention is to provide an anti-icing film comprising a polymer film substrate having a first side and a second side, an adhesive agent on the first side and a super absorbent polymer layer on the second side, wherein the super absorbent polymer is capable of absorbing and holding at least 50% of an aqueous freeze-point depressant solution and wherein the anti-icing film is applied to a surface to prevent ice formation thereon.

A further object of the present invention is to provide a method for providing anti-icing to aerodynamic surfaces to prevent foul weather icing which comprises applying an organic polymer matrix layer to the aerodynamic surface, the organic polymer matrix layer comprising a homopolymer comprising 1 to 50% porous polymer solids having a pore size of up to 100 Angstroms which is capable of absorbing and chemically bonding an aqueous freeze-point depressant solution in concentrations of from 50-99.75% by weight, whereby the freeze-point depressant solution is maintained on the aerodynamic surfaces for extended periods of time.

A still further object of the present invention is to provide a method of applying anti-icing protection to a surface comprising:

cleaning and degreasing the surface,
applying a hydrophilic polyacrylic coating to the surface, wherein the hydrophilic polyacrylic coating comprises a homopolymer having a water to solid ratio when hydrated of at least 1:1 and a water content when hydrated of from 50-99.75%.

These and other objects are achieved by applying a coating of a macroporous hyperhydroxy porous polymer material prepared by polymerizing a mixture of from 40-60 parts by weight of a purified monoester of a hydroxyalkyl acrylate having a single olefinic double bond and 40-60 parts by weight of a methacrylic acid with up to 5 parts by weight of a polymerization initiator. The resulting molar ratio of the monoester to the methacrylic acid is from 1:1 to 2.3:1 which results in a polymer that is extremely hydrophilic, having a water content, when fully hydrated, of 90-99.75%. Since deicing and anti-icing fluids are aqueous solutions, the polymer exhibits a great affinity for such fluids and is capable of absorbing and retaining such fluids for an extended period of time under adverse conditions.

The polymer can be formed as particles or granules and applied to a surface that has been treated with an adhesive agent by spraying, painting or other application means to form a coating of hydrophilic particles on such a surface to which an aqueous freeze-point depressant solution can be applied thereby hydrating the polymer to its maximum. Alternatively, the polymer can be formed as a continuous film coating applied to such surfaces either by direct polymerization in situ with or without an adhesive agent, or as an anterior or outer layer of a multi-layer film structure which is applied to the surface to form an absorbent coating thereon with the polymer hydrated by an aqueous freeze-point depressant solution.

By application of the polymer to aircraft surfaces and hydration with standard aircraft deicing solutions, anti-icing of such aircraft can be obtained for longer periods of time than the use of deicing or anti-icing fluids alone resulting in lower volumes of the fluids used which translates to cost savings for airlines and airports. In addition, because the coating is of a minimal thickness, is securely applied to the aircraft to withstand wear under operating conditions and is extremely hydrophilic so as to retain the deicing or anti-icing fluid, it provides extended deicing and anti-icing capabilities while in flight without adversely affecting the aerodynamic properties of wings and other aircraft surfaces.

DETAILED DESCRIPTION OF THE INVENTION

Figure 1:
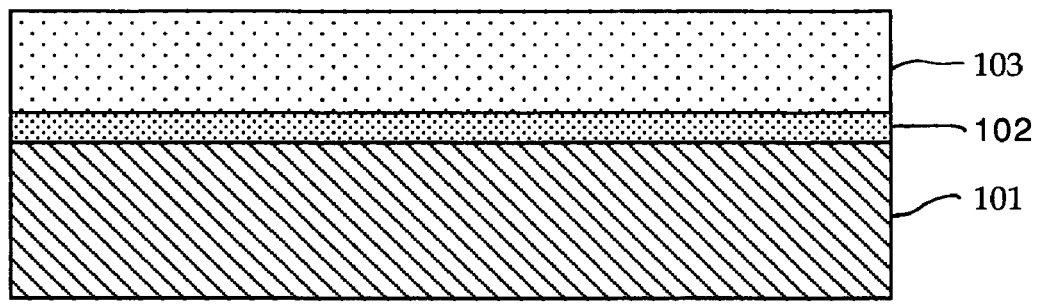
FIG. 1 is a cross section of the anti-icing coating of the present invention in its simplest form comprising the super absorbent polymer applied to a surface with an adhesive agent.

The present invention provides anti-ice protection by applying a polyacrylic or other absorbent or superabsorbent coating on surfaces requiring anti-ice protection. When combined with an aqueous freeze-point depressant solution absorbed by the absorbent layer, the resulting film provides protection from freezing precipitation and repeated icing events. Although any absorbent or superabsorbent porous polymer may have potential and be used as the absorbent layer, preferred polymers are polymers of functional acrylic monomers which are combined to form a polymer skeleton providing a high number of hydroxyl sites. One such polymer which is particularly preferred is a macroporous absorbent fraction formulated as described in the inventor's prior U.S. Pat. No. 6,201,089 and U.S. Pat. No. 6,326,446, both of which are incorporated herein in their entirety by reference thereto.

In its preferred form, the macroporous polymer used as the superabsorbent layer comprises:

a) 40-60 parts by weight of a purified monoester of a hydroxyalkyl acrylate having a single olefinic double bond,
b) 40-60 parts by weight of a methacrylic acid,
c) up to 5 parts by weight of a polymerization initiator,
wherein the molar ratio of the purified monoester of hydroxyalkyl acrylate to the methacrylic acid is from 1:1 to 2.3:1, and the polymer is capable of holding 90-99.75% water.

The polymer is produced from a monomer mixture comprising 40-60 parts by weight of a purified monoester of a hydroxyalkyl alkyl acrylate having a single olefinic double bond, 40-60 parts by weight of a methacrylic acid, and 0.001-5 parts by weight of a polymerization initiator by:

a) mixing substantially similar fractions of a purified monoester of a hydroxyalkyl acrylate having a single olefinic double bond and a methacrylic acid with a sufficient amount of a polymerization initiator,
b) holding the mixture under polymerization conditions to form a polymer gel, and
c) casting the polymer gel to shape,
whereby the polymer or an article formed therefrom is capable of holding 90-99.75% water. Polymerization is accomplished by conventional techniques such as bulk polymerization, solution polymerization, suspension polymerization or emulsion polymerization. The polymerization technique used is dependent upon the volume of polymer required and the nature of the final product being produced. The resulting product is a stereospecific isotactic heterogenous copolymer product of a thermoset resin hydrogel in which the molar ratio of monoester to diester is within the range of 1:1 to 2.3:1, preferably 1.5:1, and wherein the pore diameter of the polymer is greater than 90 Angstroms.

As the monoester of a hydroxyalkyl acrylate having a single olefinic double bond, acceptable compounds include, but are not limited to, 2-hydroxyethyl methacrylate, glyceryl methacrylate, 2-hydroxypropyl methacrylate, glycidyl methacrylate, 2-hydroxyethyl acrylate, and 2-hydroxypropyl acrylate. Acceptable methacrylic acid, includes, dimethacrylates.

The polymerization initiator may depend on the method of polymerization or the final intended use of the polymer. For example, where the polymer is to be formed as a solid object, free radical initiators may be used. Preferred initiators of that type include difunctional polyesters such as 2,5-Dimethyl-2,5-bis(2-ethylhexoylperoxy)hexane, or tertiarybutyl peroxypivilate. Alternatively, where the ultimate use of the polymer is as a coating applied in the form of the monomer mixture and polymerized in situ, the initiator may be radiation activated such as UV catalysts 2,2-Azobis(2-methylpropionitrile) or azobisbutyronitrile (AIBN). The initiators are not restricted to use in a particular polymerization method or for a particular final product. For example, the free radical initiators may be employed in coatings and the radiation activated initiators may be employed in the formation of solid articles.

In addition to the substantially similar fractions of the monoester and the methacrylic acid, the monomer mixture may be enhanced with trace amounts of a longer chain alkyl acrylate or methacrylate ester comonomer such as cyclohexyl methacrylate, trimethylolpropane trimethacrylate or ethyleneglycol dimethacrylate. Such additional comonomers enhance the polymer crosslinking for situations where added polymer strength is desired. The trace amounts of these comonomers are generally less than 0.1% by weight of the total monomer mixture.

The hyperhydroxy polymer of the present invention can be formed to produce an article which is sufficiently crosslinked by intrinsic action that the resulting article requires no additional crosslinking monomers. For example, a polymer comprising 2-Hydroxyethyl methacrylate 100 ml (50%) Methacrylic acid 100 ml (50%) 2,5-Dimethyl-2,5-bis(2-ethylhexoyl-4 drops (0.0005%) peroxy)hexane.

The monomer mixture is prepared and polymerized using the method of bulk polymerization and is cast in the desired form in an industrial convection oven at 90° C. for 30 minutes. Following this, the polymer is annealed in the oven at 110° C. for six hours. When the polymer is immersed in a buffered solution of 0.9N saline and equilibrated in a 0.9N Sorenson solution, it exhibits a saline content of 95% and a water to solid ratio of 19:1.

The particular properties of the polymer produced in this example are represented as follows:
  Water Content: 95% 0.9% N saline solution@25° C.
  Index of Refraction: 1.50-dry@25° C.
  1.33-wet@25° C.
  Linear Expansion Ratio: 2.35@25° C.
  Hardness: >90 (ASTM/Durometer) uniform hardness from a blank top to bottom and center to edge
  Elongation to Break: Exceeds 160% of hydrated diameter
  Weight: (Dry) 0.8 Gram/Unit Blank (6.0 mm.times.11.5 mm)
  Infrared spectra of the polymer obtained by Fourier Transform Infrared Spectroscopy (FTIR) measured across the range of 4400 to 450 $cm^{-1}$ show bands in the region of 3200 to 2500 $cm^{-1}$ which is characteristic of O—H stretching vibrations from hydroxyl groups, a band of 1710 to 1720 $cm^{-1}$ characteristic of C—O stretching vibrations from ester carbonyl groups and strong bands in the region of 1100 to 1300 $cm^{-1}$ characteristic of C—O stretching vibrations in esters. These bands characterize the polymer as belonging to the polyacrylate group but one which contains an unusually large number of hydroxyl groups which allow the polymer to readily absorb and hold water or aqueous solutions rendering it highly advantageous for the present invention.

Swelling upon hydration is small but noticeable (less than 10% change in linear dimension) corresponding to about a 25% volume increase. Water uptake by the resin under 100% relative humidity is on the order of 40% by weight. Despite the high water uptake by the polymer, the spectra change very little between the dry condition and the hydrated condition at 100% relative humidity. Under saturation, the peak at about 3500 $cm^{-1}$ which represents hydroxyl and water increases in width. Resaturating and redrying the polymer makes minimal changes to the infrared spectra.

The infrared spectra and weight measurements indicate that the polymer can reversibly adsorb and desorb water like a sponge without any change in its chemical characteristics. In addition, the physical characteristics remain unchanged, i.e., the polymer does not crack or dissolve. Even when dry, the spectra indicate a large amount of free hydroxyl and/or water.

By incorporating a non-reactive diluent in the monomer mixture, the polymer can be produced with significantly higher expansion and swell rates using solution polymerization techniques. Thus, in the following example, a polymer having a water to solid ratio of 399:1 can be produced. 2-Hydroxyethyl methacrylate 100 ml (25%) Methacrylic acid 100 ml (25%) 2,5-Dimethyl-2,5-bis(2-ethylhexoyl-peroxy)hexane 4 drops (0.0005%) 1,4-Butanediol (diluent) 200 ml (50%)

The monomer/diluent solution is cast into a solid, film, sheet or membrane in an industrial convection oven at 90° C. for 30 minutes. Upon removal from the oven, the non-reactive diluent fraction is removed by extraction with water and the remaining polymer is either dried or equilibrated in solution as needed for the final article. Since the diluent is non-reactive, it forms no part of the final polymer. Rather, its role is in the nature of a spacer to spread the crosslinking of the polymer thereby increasing the number of hydroxyl sites available in the polymer skeleton. The result is a polymer structure capable of increased hydration and expansion with an even higher water to solid ratio resulting in a water content of up to 99.75%.

The solid polymer produced in this manner can be granulated for use in a method where the polymer is applied to an adhesively prepared surface by vacuum deposition, spraying, painting or mechanical distribution or it can be produced as films or sheets for use with or without an additional substrate film.

The suitability of the solid polymer as an absorbent for aqueous freeze-point depressant solutions is shown by a simple freezer test. Granules of the solid polymer were prepared as above and were dehydrated to ensure full availability of the hydroxyl bonding sites to the hydrating solution. Equal weight portions of the granules were then fully saturated in 50% and 100% solutions of propylene glycol. One half of each batch of saturated granules was transferred to a laboratory dish and placed in a freezer at −20° F. for overnight storage while the remaining half of each batch was maintained at room temperature. Direct observation of each batch the following day showed no difference between the granules stored at sub-freezing temperatures and those maintained at room temperature. In both cases, the granules retained their absorbed glycol solution while the granules stored at sub-freezing temperature remained unfrozen and evidenced no ice crystal formation.

By incorporating a radiation activated polymerization initiator, such as a photocatalyst, in a solvent free casting method the polymer may be coated and polymerized in situ on surfaces to be protected against ice formation. The following is an example of such a polymer which includes a trace amount of a longer chain ester crosslinking comonomer. 2-Hydroxyethyl methacrylate 650 ml (49.96%) Methacrylic acid 430 ml (49.96%) Cyclohexyl methacrylate 1 ml (0.075%) 2,2-Azo-bis(2-methylpropionitrile) 5 gm (0.50%)

The monomer mixture is poured, sprayed or otherwise applied to a surface or a chosen mold and is irradiated with ultraviolet light in the 320-380 nm range at room temperature. Other radiation sources, such as cobalt-60, may be used depending on the specific nature of the polymerization initiator. Cure rates for radiation catalyzed polymers are a function of the surface thickness, monomer activity and radiation intensity. Radiation catalysis of the monomer mixture is particularly useful where the polymer is desired to be formed in situ as a coating on an existing structure.

A protective u.v. blocking additive of about 0.01 percent to 25 percent of a substituted 2-phenyl benzotriazole containing a styrene group or related functional u.v. absorbing compound is preferably added to the absorbent polymer formulation to improve chemical stability and coating life cycle. Physical properties including optical properties, absorbency, particle size, And mechanical properties @RT, 65° F. to 165° F., elastic modulus (tension and compression), Shear modulus, Poisson's ratio, strain to failure, ultimate strength, coefficient of thermal expansion, and density, as well as processing data as relating to temperature and viscosity are determined by standard analytical techniques.

In the method of the present invention, the super absorbent polymer is applied to a surface to be protected by one of several means to produce a coating which is then hydrated by an aqueous solution of freeze-point depressant such as ethylene glycol, propylene glycol, sodium citrate, or the like. As noted, the present method may be applied to any surface which may need protection from foul weather icing and is particularly applicable to aircraft surfaces due to the light weight of the materials and the relatively low thickness of the coating such that the aerodynamic characteristics of those surfaces are not adversely affected. Indeed, it is believed that the present method and the coatings or films employed may improve the performance of airfoil lift surfaces. Preliminary investigation indicates that the surface-to-volume ratio of the aqueous freeze-point depressant in the polymer acts to reduce friction at the surface of the polymer thereby promoting laminar air flow. Anticipated benefits of such improved surface flow dynamics include increased lift, reduced drag, lower fuel consumption, increased operating range, etc.

Figure 2:
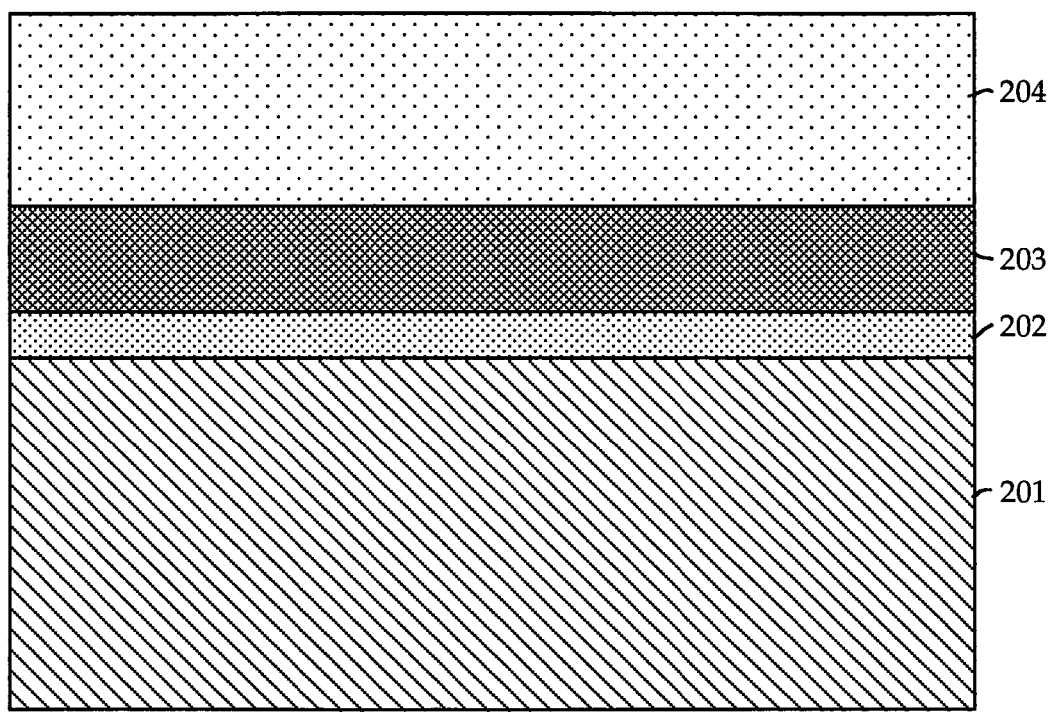
FIG. 2 is a cross section of the anti-icing coating of the present invention in the form of a multilayer film comprising the super absorbent polymer applied to a polymer film substrate and secured to a surface with an adhesive agent.

In a first embodiment, the polymer formulation described above is compounded in the form of a block polymer, graft polymer using a polyolefin or other suitable polymer film substrate to produce a flexible multilayer film, graphically represented in FIG. 2, comprising a posterior substrate 203 and an anterior absorbent polymer layer 204 which can be applied to surfaces 201 and then hydrated with an aqueous freeze-point depressant solution. Representative polymers for the substrate 203 include, but are not limited to, polyalphaolefins and high density polyethylene (HDPE) films having a thickness of about 30 microns. The polyolefin or other substrate film 203 may be surface treated with gamma radiation or other suitable procedures to improve bonding to the absorbent layer 204 and to a surface 201 with an adhesive agent 202 which is evenly applied to the substrate film 203, or to the surface 201 on which the film is to be applied, using conventional or vapor deposition methods. Depending on the adhesive agent used, a release sheet may be provided to protect the adhesive agent until use. Suitable adhesive agents include, but are not limited to, polymer adhesives such as cyanoacrylate adhesives, alcohol-silane adhesion promoting coatings or agents such as Bondit A-3 and C-52 obtained from Reltek LLC of Santa Rosa, Calif., or custom, proprietary adhesive agents based on those formulas, and other adhesives or adhesive agents suitable for use in low temperature, high wind speed and other foul weather conditions. When in place on the surface 201, the anterior absorbent layer 204 is then prepared to maximum absorbency using a propylene glycol, sodium citrate or other aqueous freeze-point depressant solution. As the freeze-point depressant solution, any of the FAA approved Type I to Type IV fluids may be used. Preferred fluids are Type I to Type IV propylene glycol or sodium citrate aqueous solutions.

As noted, the anterior absorbent polymer layer 204 may be directly cast and polymerized on the substrate film 203 in which case the substrate film 203 is prepared by appropriate means to receive the anterior polymer layer 204. This preparation may include procedures to promote a secure mechanical interface between the substrate 203 and the polymer layer 204 as the latter undergoes polymerization. Alternatively, the surface of the substrate film 203 may be prepared to promote co-polymerization with the anterior polymer layer 204 providing a secure adherence of the anterior polymer layer 204 and the substrate film 203 at the molecular level. As a further alternative, the substrate film 203 and the anterior polymer layer 204 may be cast simultaneously and co-polymerized or they may be cast and polymerized separately and secured together as a laminate using appropriate adhesives or adhesive agents.

Film construction is based on physical and performance requirements. Key elements of that construction are the functional variables of exposed saturated absorbent polymer, skeleton vacuole area, ratio of exposed absorbent polymer to percent skeleton coverage area, absorbent polymer layer thickness, percent swell of the absorbent polymer as well as stretch and shear factors which are adjusted which are adjusted and coordinated to provide maximum performance demands of the chosen substrate. Testing of selected samples is conducted by coating and testing aluminum alloy test plates 10 cm×30 cm in accordance with recommended test protocols set forth by Anti-icing Materials International Laboratory, Chicoutimi, Quebec (AMIL). Selected test sample coatings vary by thickness (thin/thick), absorbency (50% swell/100% swell) and anti-freeze fraction (propylene glycol/sodium citrate). Standardized additional material characterizations include the following: solute bond stability and preliminary wear and weatherability indicators such as tensile strength, shear and other indicators influencing life cycle. The following are examples of anti-icing films according to the present invention:

EXAMPLE 1

| Anterior Absorbent Layer | |
| --- | --- |
| Composition | Crosslinked hydroxypolymer of: |
| | 50% 2-hydroxyethyl methacrylate |
| | 50% methacrylic acid |
| Thickness | 100 microns |
| Water:Solid ratio | 99:1 |
| Pore size | 100 Angstroms |
| Absorbency | 100% |
| Hydratant | Propylene glycol |
| Posterior Substrate Layer | |
| Composition | Polyolefin |
| Thickness | 30 microns |

EXAMPLE 2

| Anterior Absorbent Layer | |
| --- | --- |
| Composition | Crosslinked hydroxypolymer of: |
| | 97.75% 2-hydroxyethyl methacrylate |
| | 2% methacrylic acid |
| | 0.25% crosslinker |
| Thickness | 50 microns |
| Water:Solid ratio | 1:1 |
| Pore size | 10 Angstroms |
| Absorbency | 50-55% |
| Hydratant | Sodium citrate |
| Posterior Substrate Layer | |
| Composition | Polyolefin |
| Thickness | 30 microns |

EXAMPLE 3

| Anterior Absorbent Layer | |
| --- | --- |
| Composition | Crosslinked hydroxypolymer of: |
| | 50% 2-hydroxyethyl methacrylate |
| | 50% methacrylic acid |
| Thickness | 50 microns |
| Water:Solid ratio | 99:1 |
| Pore size | 100 Angstroms |
| Absorbency | 100% |
| Hydratant | propylene glycol |
| Posterior Substrate Layer | |
| Composition | Polyolefin |
| Thickness | 30 microns |

Appropriate physical methods, i.e., direct in situ polymerization, adhesive, adhesive agent, are used to apply the complete anti-icing film as described onto the structural surfaces where anti-icing protection is desired. The film may be applied dry, that is without absorbed hydratant, and then hydrated with the desired aqueous freeze-point depressant solution, or it may be applied in pre-hydrated form. Following application the surface is able to maintain a lower surface temperature to prevent icing. Efficacious use and performance of the film can be determined using the following standard static performance test methods and procedures designed and conducted by the Anti-icing Materials International Laboratory (AMIL) at the University of Quebec at Chicomuni 1. Water Spray Endurance Tests (WSET)—This test is conducted according to methodology used by the Automotive Engineers SAE Aerospace Standard A55901 used to qualify aircraft anti-icing fluids by Aerospace Materials Specification AMS1428E. This test is run for approximately 4 hours and at least one WSET test is modeled to compare the test sample with the current fluid technology.

2. A High Humidity Endurance Test—This test is also required by AMS1428E. The test simulates the overnight exposure of an aircraft on the ground in open air with relative high humidity with actual temperature of the aircraft below freezing.

3. Ice Accumulation Tests (Static Adhesion Tests)—This test method was developed to evaluate the ability of solid icephobic coatings to prevent ice formation on surfaces at different angles. The icing can be separated from a cold room simulating a freezing precipitation. This test is run at two temperatures.

4. Centrifuge Adhesion Tests (CAT)—This test is used to evaluate the ability of a solid coating to reduce the adhesion of ice to a surface.

5. Based on the test results of 1-3, repeat testing is conducted to determine how many cycles of deicing the coating can undergo and remain active in anti-icing.

Following elapsed time of the decay of the film, the surface can be debrided, retreated and the film reapplied. Standard maintenance procedures are constructed to provide specific inspection, measurement and testing methods for decay and life cycle identification.

In a second embodiment, graphically shown in FIG. 1, the anti-icing coating is prepared from and comprises a macroporus polyacrylic thermoset or thermoplastic absorbent or superabsorbent polymer material prepared as described in the first embodiment and thereafter processed into micron to granule size particles able to complete uptake or full absorption under load of an aqueous freeze-point depressant solution, e.g. propylene glycol, sodium citrate, etc. The particles have a size of from 0.1 to 0.5 mm, preferably 0.1 to 0.25 mm so as to be sprayable and to form a thin coating 103 when applied to a surface 101. Using compressed gas spray deposition or other suitable delivery means this anti-freeze gel is applied to a surface 101 to be treated, such as an airfoil, electrical transmission towers, cables, ground stations, wind turbines, building surfaces, etc., and to which, preferably, a Mach One (for airfoil use) adhesive or adhesive agent 102 has been applied. As previously identified, suitable adhesives or adhesive agents are those which can reliably adhere the polymer to the surface without adverse effects on either and include, but are not limited to, polymer adhesives such as cyanoacrylate adhesives, alcohol-silane adhesion promoting coatings or agent such as Bondit A-3 and C-52 obtained from Reltek LLC of Santa Rosa, Calif., and other adhesives or adhesive agents suitable for use in low temperature and high wind speed conditions. When prepared under specialized and controlled conditions and hydrated with an aqueous freeze-point depressant fluid the resulting coating 103 acts to freeze protect those surfaces 101 just described in the same manner as the film embodiment of FIG. 2, by providing and maintaining a quantity of the freeze-point depressant solution absorbed by the polymer so as to contact any freezing or frozen precipitation impacting the surface. If desired, an amount of adhesive or adhesive agent can be mixed with the particles to promote interparticle adhesion upon application. Preferably, such adhesive or adhesive agent is the same as that applied to the surface and is one which remains on the surface of the particles, is not absorbed by the polymer and does not block the pores of the polymer to prevent hydration of the polymer by the aqueous freeze-point depressant solution.

The resulting coating has a thickness greater than one particle diameter and will protect a surface from freezing precipitation for repeated icing events. Efficacious use of the coating can be determined using standard and custom test methods and procedures designed and conducted by the Anti-icing Materials International Laboratory at the University of Quebec at Chicomuni.

In a third embodiment an alternate anti-icing film to the compounded composite film described in the first embodiment is provided. The carrier fraction anterior layer formulated as in the primary embodiment is formed and polymerized and is then bonded to a polyolefin or other suitable flexible film using a chemical adhesive or adhesive agents as previously identified and procedures such as to resist degradation from freezing precipitation and repeated icing events. This film structure is similar to that shown in FIG. 2 with the addition of an adhesive layer between the substrate 203 and the polymer layer 204.

The material must pass the previously described static performance tests of the anti-ice capability of the complete anti-icing film.

Figure 3:
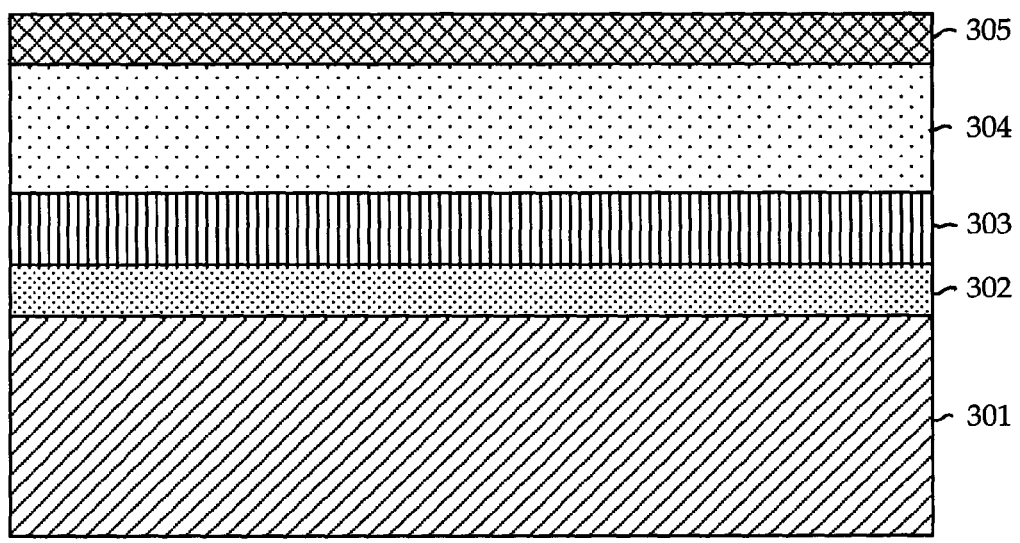
FIG. 3 is a cross section of the anti-icing coating of FIG. 2 with an added protective mesh over the super absorbent polymer layer.
Figure 4:
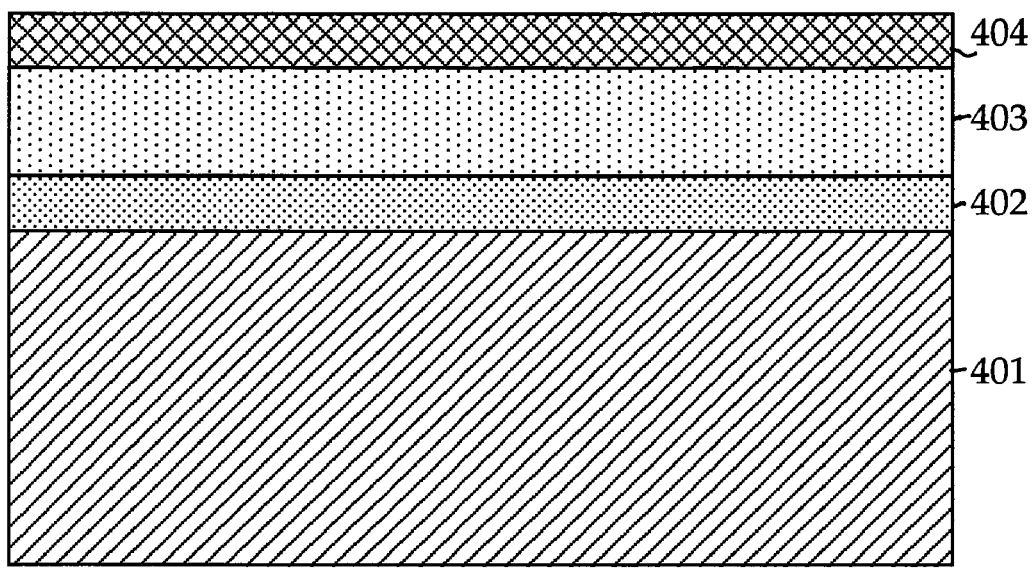
FIG. 4 is a cross section of the anti-icing coating of FIG. 1 with an added protective mesh over the super absorbent polymer.

As a further embodiment, an additional surface treatment is applied to the anterior layer 204 of the film of the first embodiment, the coating 103 of the second embodiment or the film of the third embodiment and is graphically illustrated in FIGS. 3 and 4. A semipermeable thermoset thermoplastic or other suitable material is nanolayered, scaffolded, vapor deposited, grafted, block polymerized or otherwised attached to the surface of the absorbent polymer film or coating 304, 403. This surface layer 305, 404 is constructed to improve weatherability, life cycle, foreign object damage protection and to maintain stability of the hydrated polymer fraction 304, 403 below it. This layer 305, 404 is preferably in the form of a hydrophobic, ice-phobic mesh or net over the absorbent polymer 304, 403 and is prepared from materials such as a carbon composite treated by trimethylhydroxysilane. As a mesh or net, this layer 305, 404 serves as an exoskeleton and provides physical protection to the absorbent polymer 304, 403 while permitting the absorbed freeze-point depressant to contact freezing or frozen precipitation and to be re-applied and absorbed by the underlying absorbent polymer. In this respect, the mesh size can be varied based on overall performance requirements to meet desired conditions, including the type of freeze point depressant used. In this manner, the ratio of exposed absorbent polymer to percent skeleton coverage of the mesh can be determined for optimum anti-ice capability. Because of the mesh structure of this layer 305, 404, even though it is hydrophobic or ice-phobic, it does not interfere with the aqueous freeze-point depressant solution. However, the hydrophobic or ice-phobic nature of the protective mesh does assist in preventing formation of ice on the coating. The surface 301, 401, adhesive layer 302, 402 and polymer film substrate 303 of FIGS. 3 and 4 correspond to the respective elements of FIGS. 1 and 2.

In use, application of the coating to a surface is relatively simple. For each embodiment, the surface, i.e., a wing on an aircraft, is first cleaned and degreased by normal methods to prepare the surface. Where the super absorbent polymer coating is to be applied in particle or granular form, an adhesive agent is then applied to the surface and the particles of the polymer are applied by spraying or otherwise broadcasting the particles onto the adhesive surface. Where the super absorbent polymer is applied by in situ polymerization, the monomer mixture with a polymerization initiator is spray coated, poured or painted onto the cleaned and degreased surface and the polymerization initiator is activated to polymerize and crosslink the monomers thereby forming the porous super absorbent polymer coating. When the super absorbent polymer is prepared as a preformed single or multilayer film, the surface is prepared as above and the film is laid in place with the super absorbent polymer exposed. The film preparations may be provided in a single piece to cover the desired surface, in precut sections based on the size and shape of the surface which are laid separately to form a complete coating over the surface, in rolls or sheets of the film which may be spread over the surface and cut to fit, or in any other manner commonly used to apply a film to a surface. Following application, the super absorbent polymer is hydrated as needed by application of the aqueous freeze-point depressant solution.

Figure 5:
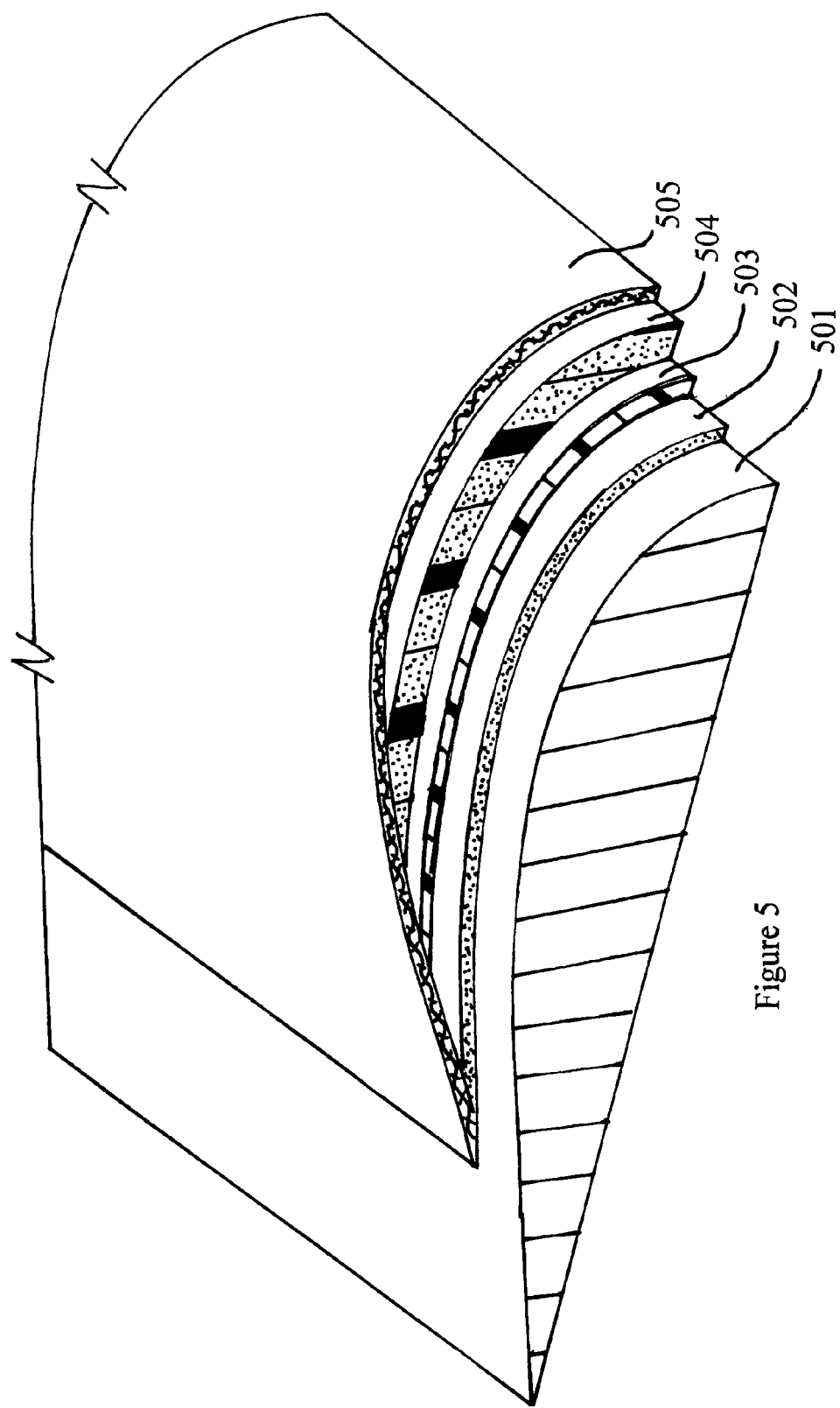
FIG. 5 is a perspective view of the anti-icing coating of FIG. 3 applied to a wing surface and showing the individual layers in greatly enlarged form.

FIG. 5 graphically illustrates an aerodynamic wing 501 on which the multilayer film comprising the polymer film substrate 503, super absorbent polymer 504 and protective mesh 505 have been applied using an adhesive or adhesive agent 502 as previously described. While the coating of the present invention may be applied so as to cover the entire aerodynamic surface, in the preferred application, the principal areas to be covered on a wing surface are the leading edge and the upper wing surface from the leading edge rearward approximately one third to one half the depth of the wing. Also, in those embodiments including the protective mesh 305, 404 and 505, as shown in FIG. 5, the mesh 505 preferably extends beyond the edges of the underlying layers so as to provide protection to those edges, the mesh being secured to the surface being protected by the adhesive agent 102, 202, 302, 402 and 502.

The spectrum of variations of foul weather conditions resulting in freezing precipitation and repeating icing events creates a wide range of material surface icing conditions. The embodiments described above can be modified in composite construction to improve the economy of use without departing from the scope of this invention. Thickness and weight reductions are made to each of the absorbent, substrate, and adhesive layers so as to match performance to cost for its intended end use. In addition UV catalysis and other ambient or room temperature polymerization methods are available to improve the economy of fabrication and application.

What is claimed is:

1. A freeze-point reducing method for single or repeated icing events comprising providing a freeze protection composite on a surface to be protected, said composite comprising a super absorbent polymer an aqueous freeze-point depressant solution absorbed by said super absorbent polymer and a protective mesh over said polymer whereby said mesh has a porosity to permit passage of said freeze-point depressant solution while providing wear protection to said super absorbent polymer, said composite providing a continuous coating on said surface, whereby a content of at least 50% of said freeze-point depressant solution is absorbed and held by said super absorbent polymer providing freeze-point reduction throughout single or repeated icing events.

2. The freeze-point reducing method of claim 1 further comprising providing said freeze-point protection composite as a preformed laminate structure comprising a substrate film, said super absorbent polymer applied as a continuous polymer layer to said substrate film and said mesh applied over said polymer, wherein said laminate structure is applied to said surface to be protected by adhering said substrate film to said surface, and said aqueous freeze-point depressant solution is applied to said super absorbent polymer, whereby said freeze-point depressant solution is absorbed and held by said super absorbent polymer, and whereby said laminate structure is applied to said surface prior to an icing event and said freeze-point depressant solution is applied on an as needed basis.

3. The freeze-point reducing method of claim 2 wherein the surface to be protected is an aerodynamic surface.

4. The freeze-point reducing method of claim 1 comprising providing said super absorbent polymer in the form of a plurality of macroscopic particles of said polymer having said freeze-point depressant solution preabsorbed therein, applying an adhesive agent to said surface to be protected and applying said preabsorbed particles to said adhesive agent whereby a coating of said particles is formed on said surface and applying said protective mesh over said coating.

5. The freeze-point reducing method of claim 4 wherein the surface to be protected is an aerodynamic surface.

6. The freeze-point reducing method of claim 1 comprising:
providing said freeze-point protection composite as a hydrophilic polyacrylic coating to said surface, wherein said hydrophilic polyacrylic coating comprises a polymer having a water to solid ratio when hydrated of at least 1:1 and a water content when hydrated of from 50-99.75% and applying said aqueous freeze-point depressant solution to said hydrophilic polyacrylic coating.

7. The method of claim 6 wherein said hydrophilic polyacrylic coating comprises a polymer having a water-to-solid ratio of at least 19:1 and a water content when hydrated from 90-99.75%.

8. The method of claim 6 further comprising providing said hydrophilic polyacrylic coating in the form of a laminate of said polymer on a polymer film substrate and applying said laminate to said surface with an adhesive agent.

9. The method of claim 6 wherein said hydrophilic polyacrylic coating comprises a polymer comprising 40-60 parts by weight of a purified monoester of a hydroxyalkyl acrylate having a single olefinic double bond and 40-60 parts by weight of a methacrylic acid.

10. The method of claim 9, wherein the monoester of a hydroxyalkyl acrylate is selected from the group consisting of 2-hydroxyethyl methacrylate, glyceryl methacrylate, 2-hydroxypropyl methacrylate, 2-hydroxyethyl acrylate and 2-hydroxypropyl acrylate.

11. The method of claim 9 comprising applying said hydrophilic polyacrylic coating by in situ polymerization of said polymer on said surface.

12. The method of claim 9 comprising preparing said polymer in granular form, mixing said polymer granules with a adhesive and spraying said adhesive/granule mixture onto said surface.

13. The method of claim 9 wherein said protective mesh comprises a carbon composite treated with trimethylhydroxysilane.

* * * * *